United States Patent
Ismail et al.

(10) Patent No.: US 12,415,459 B2
(45) Date of Patent: Sep. 16, 2025

(54) IMAGING SYSTEM

(71) Applicant: Harman Becker Automotive Systems GmbH, Karlsbad (DE)

(72) Inventors: Sameel Kassim Ismail, Garching (DE); Peter Brandt, Pfinztal (DE); Ramazan Ferhat Ölgün, Munich (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 18/619,644

(22) Filed: Mar. 28, 2024

(65) Prior Publication Data

US 2024/0336201 A1  Oct. 10, 2024

(30) Foreign Application Priority Data

Apr. 5, 2023 (EP) .................................. 23166802

(51) Int. Cl.
 *B60R 1/29* (2022.01)
 *B60R 1/08* (2006.01)
 *B60R 11/04* (2006.01)
 *B60R 1/12* (2006.01)

(52) U.S. Cl.
 CPC ............... *B60R 1/29* (2022.01); *B60R 1/08* (2013.01); *B60R 11/04* (2013.01); *B60R 2001/1253* (2013.01)

(58) Field of Classification Search
 CPC .............. B60R 1/29; B60R 1/08; B60R 11/04
 USPC ........................................................ 348/148
 See application file for complete search history.

(56) References Cited

U.S. PATENT DOCUMENTS

| | | | |
|---|---|---|---|
| 8,098,142 B2 * | 1/2012 | Schofield | B60R 21/01538 348/148 |
| 10,764,484 B2 | 9/2020 | Slama | |
| 2004/0252993 A1 | 12/2004 | Sato | |
| 2013/0128333 A1* | 5/2013 | Agrawal | B60R 1/12 359/267 |
| 2020/0186701 A1 | 6/2020 | Lintz et al. | |
| 2020/0384924 A1* | 12/2020 | Broghammer | B60R 1/12 |
| 2022/0252924 A1 | 8/2022 | Noble | |
| 2024/0308427 A1* | 9/2024 | Baur | B60R 11/00 |
| 2025/0047968 A1* | 2/2025 | Chung | H04N 23/667 |
| 2025/0068024 A1* | 2/2025 | Lynam | B60R 1/12 |

FOREIGN PATENT DOCUMENTS

| WO | 2022187805 A1 | 9/2022 |
|---|---|---|
| WO | 2022241423 A1 | 11/2022 |

OTHER PUBLICATIONS

European Search Report dated Oct. 20, 2023 for European Patent Application No. 23166802.1, 8 pages.

* cited by examiner

*Primary Examiner* — Joseph G Ustaris
(74) *Attorney, Agent, or Firm* — Brooks Kushman, P.C.

(57) ABSTRACT

An imaging system for a driver monitoring system, comprising: a mirror element; a camera comprising an imaging sensor, the camera being provided at a back side of the mirror element; and a control unit; wherein the control unit is configured to switch the mirror element from a reflective mode to a transmissive mode when the camera starts to scan a row of pixels of the imaging sensor, and switch the display from the transmissive mode to the reflective mode when the camera moves to a next row of pixels.

17 Claims, 5 Drawing Sheets

IMAGING SYSTEM

CROSS-REFERENCE TO RELATED APPLICATIONS

This application claims priority to EP application Ser. No. 23/166,802.1 filed Apr. 5, 2023, the disclosure of which is hereby incorporated in its entirety by reference herein.

TECHNICAL FIELD

The present disclosure relates to an imaging system, a rearview mirror and a driver monitoring system comprising the imaging system, as well as a method of imaging an object.

BACKGROUND

Recently, driver monitoring systems have gained significant popularity as an essential safety feature in vehicles, offering a way to prevent accidents and enhance the safety of all occupants.

Some driver monitoring systems employ a camera placed on a steering column which tracks the face of a driver such as their eyelid movements, head tilting angle, or other physiological signals, and provide an alarm to the driver to help them stay alert and focus on road conditions. Some systems monitor the driver's heart rate and breathing patterns to detect changes that may indicate a medical emergency. Some other driver monitoring systems employ a camera positioned behind a semitransparent mirror of a rearview mirror of a vehicle. The system comprises a camera and sensors that are positioned to monitor the driver's face and eyes. The camera captures images of the driver's face, and the sensors track the body movement of the driver, such as eyes, head, or body. The system also includes a image processing device that analyzes the images and detects signs of driver distraction, drowsiness, or fatigue. When the system detects such signs, the system alerts the driver accordingly and helps the drive to refocus on the road conditions. A driver monitoring system being included in a rearview mirror of a vehicle allows for easy integration into existing vehicle designs and enhances the overall safety of the vehicle in a cost-efficient way. Driver monitoring systems are, for example, described in US10764484B2, US20220252924A1, WO2022241423A1.

SUMMARY

An aspect of the present disclosure relates to an imaging system for a driver monitoring system, including: a mirror element; a camera comprising an imaging sensor, the camera being provided at a back side of the mirror element; and a control unit; wherein the control unit is configured to switch the mirror element from a reflective mode to a transmissive mode when the imaging sensor of the camera starts to scan a row of pixels on the imaging sensor, and switch the mirror element from the transmissive mode to the reflective mode during the time in which the imaging sensor of the camera moves to a next row of pixels. The components of the imaging system may be accommodated in a housing of a rearview mirror of a vehicle. During the manufacturing of a vehicle, the components of the imaging system may be assembled within the interior space of the rearview mirror. After assembly, the imaging system may not be seen from outside. From the driver or a passenger's perspective, the rearview mirror may be a conventional rearview mirror being mounted on the windshield of the vehicle. During driving, the driver can use the rearview mirror to see what is behind the vehicle without turning their head. Meanwhile, the driver monitoring system inside the rearview mirror can monitor the behaviour of the driver to improve road safety. In a preferred embodiment, the components of the imaging system are invisible to the driver, so that the driver would not be distracted or overwhelmed by the components.

In one embodiment, the mirror element includes: a twisted nematic (TN) liquid crystal cell; a first conductive glass panel and a second conductive glass panel being positioned at both sides of the twisted nematic liquid crystal cell and being adjacent to the twisted nematic liquid crystal cell; and a first polarizer and a second polarizer being positioned adjacent to the first conductive glass panel and the second conductive glass panel, respectively. The mirror element may be mounted on a frame of the rearview mirror. Preferably, the rearview mirror may be mounted in the middle interior of the vehicle in the transverse direction. The TN liquid crystal cell includes liquid crystal materials having long, rod-like molecules that can align themselves in a specific direction when an electric field is applied to the TN liquid crystal cell. This enables the switching of the mirror element between the transmissive mode and the reflective mode.

Alternatively, in one embodiment, the mirror element includes: a TN liquid crystal cell, both sides of the TN liquid crystal cell being covered with transparent electrodes; a first glass panel and a second glass panel being positioned at both sides of the twisted nematic liquid crystal cell and being adjacent to the transparent electrodes; a first polarizer and a second polarizer being positioned adjacent to the first glass panel and the second glass panel, respectively. The TN liquid crystal cell preferably formed as previously described.

In one embodiment, the first polarizer and the second polarizer are aligned in a same polarization direction, or the first polarizer and the second polarizer are aligned in a direction perpendicular to each other. In both cases, the mirror element can be switched between the transmissive mode and the reflective mode. This embodiment may be combined with the previously described embodiments.

In particular, the polarizer positioned proximate to the camera is a reflective polarizer. The reflective polarizer reflects light waves of a specific polarization while transmitting light waves of an opposite polarization. This allows light having a particular polarization to be reflected by the reflective polarizer.

Preferably, the imaging system further includes one or more infrared (IR) illuminators proximate to the camera. The one or more IR illuminators can work in conjunction with other components of the system to capture high quality images. For example, the IR illuminator may be positioned proximate to the camera to capture clear and detailed images of an object in low light conditions or even in complete darkness. The IR illuminator may include IR LEDs. IR LEDs are small in size, energy efficient and have a relatively long-life span. Alternatively or additionally, the IR illuminator may include IR lamps which have a longer illumination distance. In one embodiment, the intensity of the emitted light of the IR illuminator may be adjusted to by the control unit to suit the specific lighting conditions. Additionally, the angle of the emitted light of the IR illuminator may also be adjusted by the control unit.

The control unit preferably includes a driving circuit for applying an electric field (voltage) to the twisted nematic liquid crystal cell to control the orientation of the liquid crystal molecules in the twisted nematic layer. Through applying the electric field or removing the electric field, the mirror element switches between the above described two modes.

A further aspect of the present disclosure relates to a rearview mirror including an imaging system as described above. The rearview mirror may be mounted in the middle interior of the vehicle in the transverse direction. The rearview mirror may also be mounted on the left and right side of the vehicle.

A further aspect of the present disclosure relates to a monitoring system, in particular a driver monitoring system, including an imaging system as described above. The driver monitoring system may monitor the behaviour of the driver, such as eye movement, head position, by using the imaging system as described above, so as to improve road safety of vehicles.

A further aspect of the present disclosure relates to a vehicle including an imaging system as described above.

A further aspect of the present disclosure relates to a method of imaging an object for a driver monitoring system, including: switching a mirror element into a transmissive mode and scanning a row of pixels of an imaging sensor; and after finishing scanning the current row of pixels, switching the mirror element into a reflective mode and moving to a beginning of a second row of pixels. In particular, the control unit controls that after the mirror element is switched to the transmissive mode, the scanning of the row of pixels immediately ensues without any delay or interruption. Similarly, after finishing scanning the current row of pixels, the mirror element is switched into another mode immediately without any delay or interruption. An object may for example be the head or face or upper body of a driver.

The method further includes after finishing scanning all pixels of the imaging sensor, combining the scanned pixels to obtain an image of the object. The control unit combines the scanned pixels into a complete image. The control unit may perform a series of tasks to combine the scanned pixels, including color correction, noise reduction, and image compression. The control unit may use advanced image processing algorithms that analyze the pixel data to identify specific patterns or changes in the object's, in particular the driver's, appearance or behavior. For example, the control unit may use machine learning algorithms that have been trained on a dataset of images and videos of drowsy or fatigued drivers to recognize these visual cues in real-time in the obtained image.

A further aspect of the present disclosure relates to a method of monitoring an object, in particular a driver, including the method as described above. Preferably, the method of monitoring further includes further processing the image to identify specific patterns or changes in the object's appearance or behavior. Based on the analysis of the imaged data, the driver could be provided with visual and audible alerts when unsafe behavior is detected, such as drowsiness, sudden health emergence and similar.

A further aspect of the present disclosure relates to a computer program product comprising a computer-readable storage medium including instructions that, when executed by one or more processors, cause the one or more processors to perform the method as described above.

BRIEF DESCRIPTION OF THE DRAWINGS

Example embodiments of the disclosure will be described, by way of example only, with reference to the accompanying drawings in which.

DETAILED DESCRIPTION

There now follows, by way of example only, a detailed description of embodiments of the present disclosure. The examples are described in reference to the figures identified above, which are included to provide further detail and clarity. It should be understood that the examples described are not limiting, and that other examples falling within the scope of the disclosure may exist.

Figure 1:
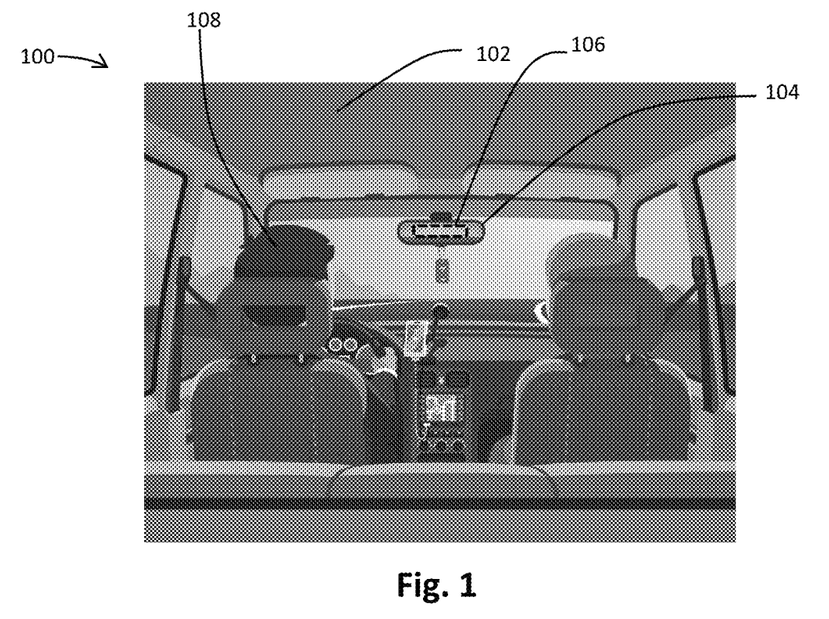
FIG. 1 is a perspective overview of an interior of a vehicle including a driver monitoring system.

Referring to FIG. 1, there is shown a driver monitoring system 100 included in a vehicle 102 to monitor a driver 108. The driver monitoring system 100 includes an imaging system 106 (shown as a dashed rectangle). Components of the imaging system 106 are preferably accommodated in a housing of a rearview mirror 104 of the vehicle 102. During manufacturing of a vehicle, the components of the imaging system 106 may be assembled within the interior space of the rearview mirror 104. After assembly, the imaging system can preferentially not be seen from the outside. From the driver 108 or a passenger's perspective, the rearview mirror 104 may be a conventional rearview mirror being mounted on the windshield of the vehicle 102. During driving, the driver 108 can use the rearview mirror 104 to see what is behind the vehicle without turning their head. Meanwhile, the driver monitoring system 100 inside the rearview mirror 104 can monitor the behaviour of the driver to improve road safety. In a preferred embodiment, the components of the imaging system 106 are invisible to the driver, so that the driver would not be distracted or overwhelmed by the components.

It goes without saying that the driving motioning system may also be implemented in environments other than a vehicle. For example, the driving motioning system may be implemented in an airplane or a flight simulator. The driving motioning system may further be implemented in heavy machinery or equipment to ensure that operators are alert and attentive while operating the machinery. It may also be used in mining and construction equipment to monitor operators and alert them to potential hazards, such as fatigue or distraction, thereby reducing the risk of accidents and improving workplace safety.

Figure 2:
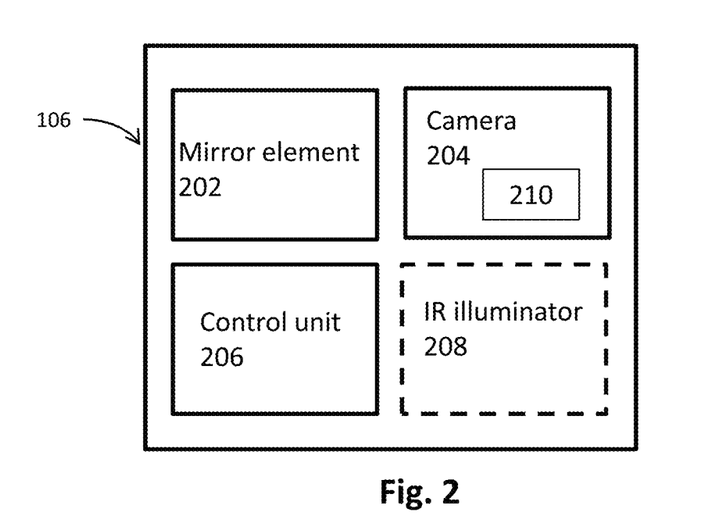
FIG. 2 is a schematic view of a driver monitoring system.

FIG. 2 is a schematic view of the imaging system 106 in detail. The imaging system includes a mirror element 202, a camera 204 and a control unit 206. Additionally, the imaging system 106 may also include an infrared illuminator 208. In one embodiment, the mirror element 202 is mounted on a frame of the rearview mirror. The rearview mirror may correspond to the rearview mirror 104 shown in FIG. 1. In the present disclosure, the rearview mirror is preferably a rearview mirror that is mounted in the middle interior of a vehicle as shown exemplarily in FIG. 1. It goes without saying that the rearview mirror may also be a left or right rearview mirror of a vehicle. The mirror element 202 includes a front side and a back side, the front side of the mirror element is the side that faces a viewer, in particular the driver, and the back side of the mirror element is the side that faces away from viewer. Structures of the mirror element will be described in detail with reference to FIG. 3.

The camera 204 is designed to capture facial data of the driver, for example, during driving. The camera 204 may be provided at the back side of the mirror element 202. The camera 204 may be positioned within the housing of the rearview mirror. Generally, the camera 204 may be any imaging device which is capable to take images of a scene. For example, the camera 204 may be a CCD camera or a CMOS camera. CCD cameras are known for their high sensitivity and low noise, making them ideal for use in low-light conditions. CMOS cameras are known for their low power consumption and high-speed performance, making them suitable for use in mobile applications. The camera may also be, or include, an infrared camera to provide a high degree of detail and clarity in low-light or no-light conditions, such as driving at night. Moreover, the camera 204 may be, or include, a wide-angle camera. This is particularly useful for capturing images of the driver accurately, no matter whether the driver sits closer to the steering wheel or further away.

The camera 204 includes an imaging sensor 210 to capture images by converting the light from a scene into electrical signals. For example, during driving, the imaging sensor can scan the face of the driver from line to line, with each line of pixels capturing the light intensity and color information of a portion of the face. In this specific example, the face of the driver constitutes the object to be imaged. When light enters the camera 204 through its lens (not shown), it is focused onto the surface of the imaging sensor, where each pixel detects the amount of light falling onto it. The light is converted into an electrical charge, which is then amplified and read out by a circuit on the imaging sensor. The readout process may be done in a row-by-row (line-by-line) fashion, starting from the top of the image and moving down to the bottom or vice versa. Once the image is captured by the imaging sensor, it is transferred to the control unit 206 for further analysing.

In the imaging system 206, the control unit 206 is configured to control and coordinate the functions of other components in the imaging system 206, for example, the mirror element 202 and the camera 204. For example, the control unit 206 controls the settings of the camera 204, and the processing of image data for storage and analysis. The control unit 206 may include a microcontroller with advanced image processing capabilities. In an alternative embodiment, the control unit 206 may include a computer system with specialized software and/or firmware for image analysis. The control unit may be located outside the camera. Alternatively or additionally, the control unit may be integrated into the camera.

Preferably, the imaging system 106 may also include an infrared (IR) illuminator 208, which works in conjunction with other components of the system to capture high quality images. The IR illuminator 208 may be positioned proximate to the camera 204 to capture clear and detailed images of an object in low light conditions or even in complete darkness. In one embodiment, the IR illuminator 208 may include IR LEDs. IR LEDs are small in size, energy efficient and have a relatively long-life span. Alternatively, the IR illuminator 208 may include IR lamps which have a longer illumination distance. In one embodiment, the intensity of the emitted light of the IR illuminator 208 may be adjusted to by the control unit 206 to suit the specific lighting conditions. Additionally, the angle of the emitted light of the IR illuminator 208 may also be adjusted by the control unit 206.

Figure 3A:
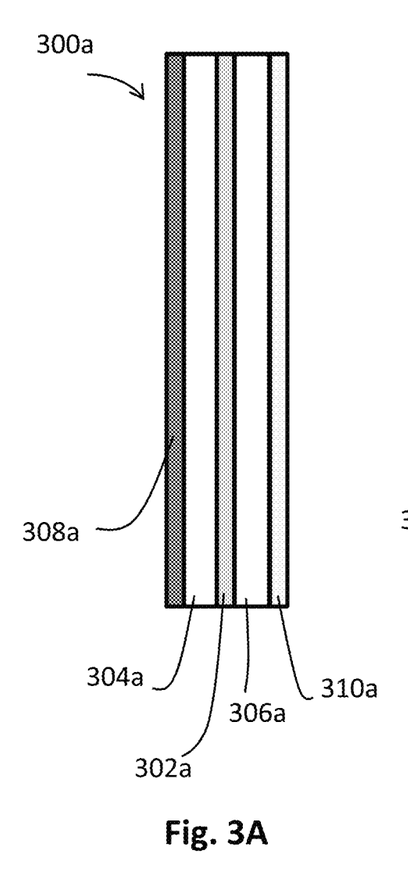
FIG. 3A is a schematic structure of a mirror element according to one or more embodiments.

Referring to FIG. 3A, there is shown a schematic structure of a mirror element 300a of the imaging system 106 of the driver monitoring system 100 according to one embodiment. The mirror element 300a may include a twisted nematic (TN) liquid crystal cell (or layer) 302a. The TN liquid crystal cell 302a includes liquid crystal materials having long, rod-like molecules that can align themselves in a specific direction when an electric field is applied to the TN liquid crystal cell 302a. The TN liquid crystal cell 302a is sandwiched between a first and a second conductive glass panel 304a and 306a. That is, the first and a second conductive glass panels 304a and 306a are positioned at both sides of the TN liquid crystal cell 302a, respectively. The first and second conductive glass panels 304a and 306a are adjacent to the TN liquid crystal cell 302a. In such way, the first and second conductive glass panels 304a and 306a can be used to apply an electric field to the TN liquid crystal cell 302a. This allows for the manipulation of the molecular orientation of the liquid crystals in the TN liquid crystal cell 302a, leading to changes in the polarization of light passing through the cell.

The first conductive glass panel 304a is covered with a first polarizer 308a, and the second conductive glass panel is covered with a second polarizer 310a. The first and second polarizers are a type of optical filter that is used to control the polarization of light. The polarizers are made up of a material that selectively transmits light waves that are oscillating in a specific direction, while blocking or absorbing light waves that are oscillating in other directions. For example, the polarizers may be comprise a thin layer of material that includes aligned molecules. When unpolarized light passes through the filter formed by the polarizers, the light waves that are oscillating in the same direction as the aligned molecules are transmitted, while the light waves that are oscillating perpendicular to the alignment are blocked. In particular, one of the first polarizer 308a and the second polarizer 310a may be a reflective polarizer, which reflects light waves of a specific polarization while transmitting light waves of an opposite polarization, while the other polarizer of the first polarizer 308a and the second polarizer 310a may be a conventional polarizer that allows light wave to be transmitted in a particular polarization.

Figure 3B:
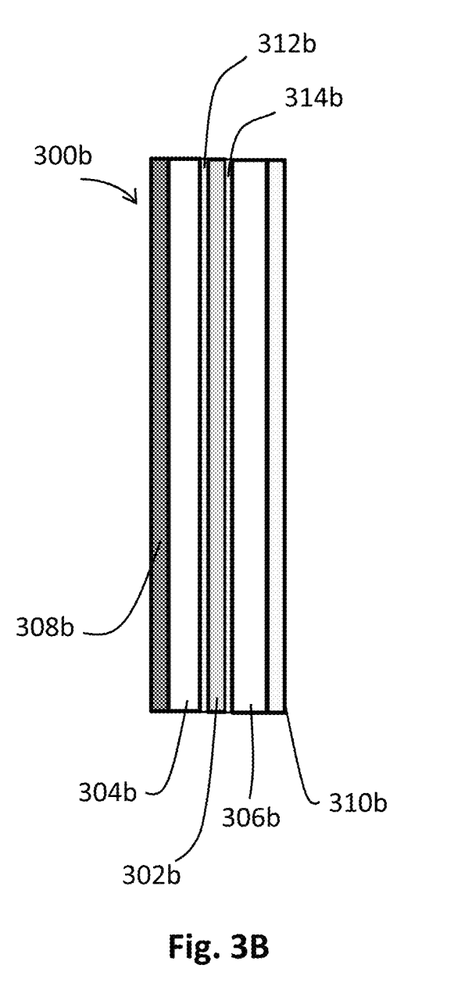
FIG. 3B is a schematic structure of a mirror element according to one or more embodiments.

Referring to FIG. 3B, there is shown a schematic structure of a mirror element 300b according to another embodiment. The mirror element 300b may include a TN liquid crystal cell (or layer) 302b which is the same as the twisted nematic (TN) liquid crystal cell (or layer) 302a described in conjunction with FIG. 3A. The mirror element 300b differs from the mirror element 300a in that a first glass panel 304b and a second glass panel 306b are conventional glass panels positioned in the mirror element 300b to protect the TN liquid crystal cell 302b. In order to apply an electric field to the TN liquid crystal cell 302b, the TN liquid crystal cell 302b is sandwiched between two transparent electrodes 312b and 314b. The two transparent electrodes 312b and 314b are positioned adjacent to the TN liquid crystal cell 302b, respectively.

The first glass panel 304b is covered with a first polarizer 308b, and the second glass panel 306b is covered with a second polarizer 310b. These two polarizers 308b and 310b are the same as the first polarizer 308a and the second polarizer 310a described above in conjunction with FIG. 3A.

The mirror elements 300a and 300b have two modes: a transmissive mode and a reflective mode. In the transmissive mode, electromagnetic radiation, such as light, can pass through the mirror element with minimal reflection, scattering or absorption. In other words, the mirror element in the transmissive mode behaves like a regular glass panel, which exhibits excellent transparency and clarity. In contrast to the transmissive mode, in the reflective mode, electromagnetic radiation reaching the mirror element is reflected back to a viewer, for instance the driver. In other words, the mirror element in a reflective mode behaves like a regular mirror.

Figure 4A:
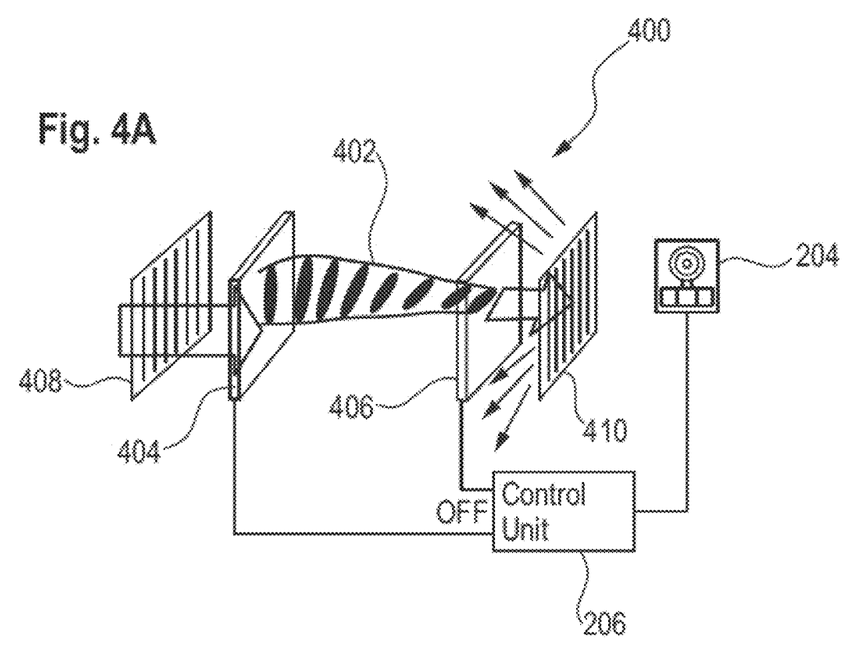
FIG. 4A and FIG. 4B are schematic diagrams of a reflective mode and a transmissive mode of a mirror element according to one or more embodiments.

FIG. 4A is a schematic view of a reflective mode of a mirror element of an imaging system of a driver monitoring system 400 as exemplarily shown in FIG. 1, the driver monitoring system 400 corresponding to the driver monitoring system 100 with the imaging system 106 shown in FIGS. 1 and 2. The mirror element shown in FIG. 4 corresponds to the mirror element 202 shown in FIG. 2 and in particular to the mirror element 300a shown in FIG. 3A.

The driver monitoring system 400 may be initiated in various ways depending on specific systems and vehicles. For example, the driver monitoring system 400 may be automatically initiated when an engine of a vehicle is started, or when the driver's seatbelt is fastened. This may involve using sensors to detect a driver's presence or movements, such as a weight sensor in the driver seat or a camera mounted on the dashboard. Alternatively or additionally, the driver monitoring system may be manually activated by the driver through a button or switch on the dashboard or steering wheel. The driver monitoring system may also be manually activated remotely through mobile devices, such as smartphones, tablets, smartwatches or the like. This may allow the driver or a vehicle owner to activate the system from a distance, such as when someone else is using the vehicle or when a teenage driver is to be monitored, or when a truck driver is to be monitored especially during night duty. Remote initiation of the driver monitoring system may involve using a dedicated application that is installed on a mobile device. The application may allow a user to activate the system, set alerts or notifications, and view real-time data about the driver's behavior.

Referring to FIG. 4A, the two conductive glass panels 404 and 406 of the mirror element are electrically connected to the control unit 206, the conductive glass panels 404 and 406 corresponding to the conductive glass panels 304a and 306a described in connection with FIG. 3A. A camera 204 is both electrically and communicatively connected to the control unit 206, enabling the control unit 206 to exercise control over the camera 204 and the camera's functionalities. The camera 204 and the control unit 206 correspond to the camera and the control unit described in connection with FIG. 2. The camera 204 may preferably be mounted at a backside of the imaging system. It is noted that a viewer side or front side is located adjacent to a first polarizer 408, and a back side is located adjacent to a second polarizer 410, the first polarizer 408 and the second polarizer 410 corresponding to the first polarizer 308a and the second polarizer 310a described in conjunction with FIG. 3A. When the control unit 206 receives a signal from the vehicle's ignition system, the control unit 206 may send a start command to the camera 204. The camera 204 may capture images and/or video(s) of an object such as the driver's face, head, and eyes to detect signs of fatigue, distraction, or drowsiness. The control unit 206 may also control the camera's sensitivity, resolution, exposure settings or the like to optimize image quality and minimize false alarms. It may also use algorithms and machine learning techniques to analyse the camera data in real-time and generate alerts or warnings if the driver shows signs of unsafe behavior. The camera 204 includes an imaging sensor having a two-dimensional array of light-sensitive components, namely pixels. The pixels are arranged in rows and columns on the sensor, with each pixel responsible for capturing the light that falls on it and converting it into an electrical signal. The rows and columns of the pixels on the imaging sensor are read out sequentially to create an image. The imaging sensor scans a scene, and hence the object to be captures/imaged, line by line, starting preferentially at the top left corner of the image and moving to the right until image sensor reaches the end of the row. The image sensor then moves to the next row and repeats the process until the entire image has been captured.

The control unit 206 is responsible for initiating and controlling the camera 204 and the mirror element. The control unit 206 may include a microprocessor, software and/or firmware, and input/output interfaces. The microprocessor executes instructions that control the operation of the camera 204 and the mirror element. The input/output interfaces allow the control unit 206 to communicate with the imaging sensor of the camera 204.

As can be seen from FIG. 4A, the polarization direction of the first polarizer 408 and the second polarizer 410 are aligned in a same direction. When no voltage is applied to the two conductive glass panels 404 and 406 (denoted as "OFF" in FIG. 4A), the molecules of the twisted nematic liquid crystal cell 402 remain twisted at an angle of 90 degrees between the first polarizer 408 and the second polarizer 410, whereas only the second polarizer 410 is a reflective polarizer. This twist causes the polarization direction of light entering the first polarizer 408 and passing through the twisted nematic liquid crystal cell 402 to rotate by 90 degrees. As a result, the polarization of the light exiting the twisted nematic liquid crystal cell 402 is perpendicular to the polarization of the second polarizer 410. Consequently, light cannot pass through the second polarizer 410 and is reflected by the second polarizer 410. Such state of the mirror element is referred to as the reflective mode. In the reflective mode, the mirror element behaves like a regular mirror. The mirror element in the reflective mode helps the driver to see the scene behind them without turning their head. The twisted nematic liquid crystal cell 402 corresponds to the twisted nematic liquid crystal cell 302a, 302b described in conjunction with FIGS. 3A and 3B.

Figure 4B:
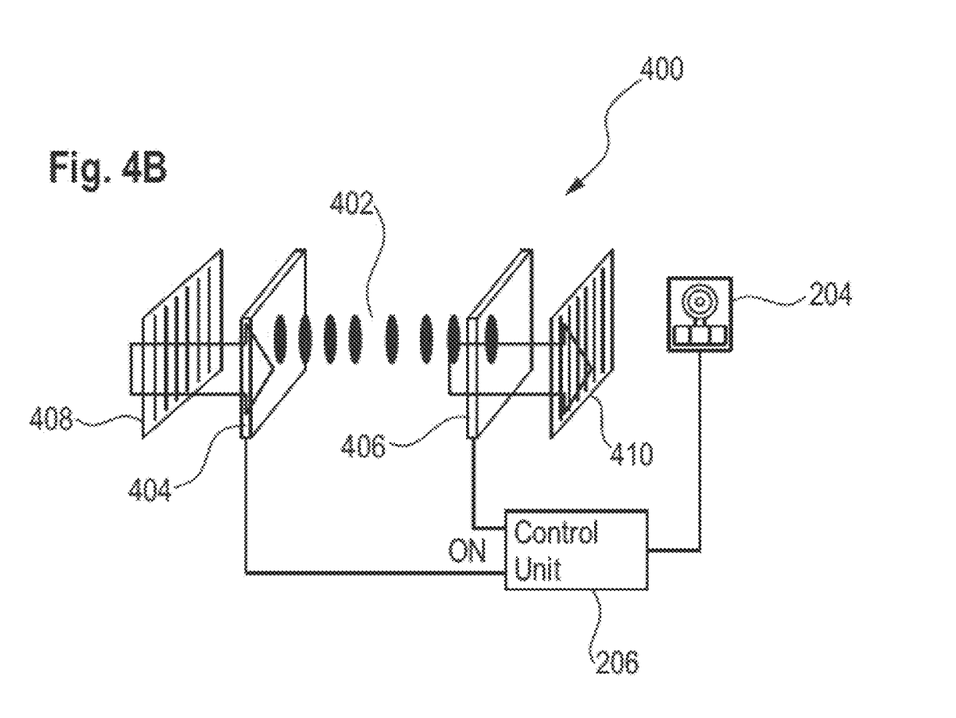

Referring to FIG. 4B, when the control unit 206 applies an electric field to the two conductive glass panels 404 and 406 (denoted as "ON" in FIG. 4B), the twist of the molecules in twisted nematic liquid crystal cell 402 is unwind (untwisted). Hence, light entering the first polarizer 408 can pass through the second polarizer 410 after exiting the twisted nematic liquid crystal cell 402. Such state of the mirror element is referred to as the transmissive mode. In the transmissive mode, the mirror element behaves like a regular glass panel having high transparency and clarity. In the transmissive mode, light passes through the mirror element and reaches the camera 204. In the embodiment as shown in FIGS. 4A and 4B, the application of the electric field switches the reflective mode of the mirror element to the transmissive mode. Similarly, when the control unit 206 removes the electric field on the two conductive glass panels 404 and 406, the mirror element will be switched back to the reflective mode.

In the embodiment depicted in FIGS. 4A and 4B, the mirror element starts in the reflective mode (FIG. 4A, "OFF" state). When the imaging sensor of the camera 204 starts to scan a row of pixels as described above, the control unit applies an electric field to the conductive glass panels 404 and 406. Under the effect of the electric field, the reflective mode of the mirror element is switched to the transmissive mode. As such, light can pass through the mirror element and falls onto the imaging sensor. After finishing scanning the current row, the imaging sensor moves to a next row. During the time of moving from the current row to a next row, the control unit 206 removes the electric field applied to the conductive glass panels 404 and 406. Consequently, the transmissive mode of the mirror element is switched to the reflective mode. Similarly, when the imaging sensor starts to scan the next row of pixels, the reflective mode of the mirror element is again switched to the transmissive mode. This process is repeated until the scanning process is completed. Afterwards, the image is assembled from the individual rows captured by the imaging sensor for further processing by the control unit 206. Throughout the scanning process, the mirror element switches repeatedly between the two modes, but a viewer (a driver or a passenger sitting in the vehicle) would not notice this due to the subtle time intervals between each transition. Within the whole time, the viewer may uninterruptedly use the mirror element as a regular rearview mirror.

In the embodiment shown in FIGS. 4A and 4B, the polarization directions of the two polarizers 408 and 410 are aligned in the same direction. In such an alignment, since the mirror element 400 behaves like a regular mirror when there is no voltage applied to the conductive glass panel, the viewer may not see through the mirror element and notice the camera, regardless of whether the vehicle is powered on or powered off. However, it is possible that the polarization direction of the two polarizers align in directions perpendicular to each other. This is illustrated in FIGS. 5A and 5B.

Figure 5A:
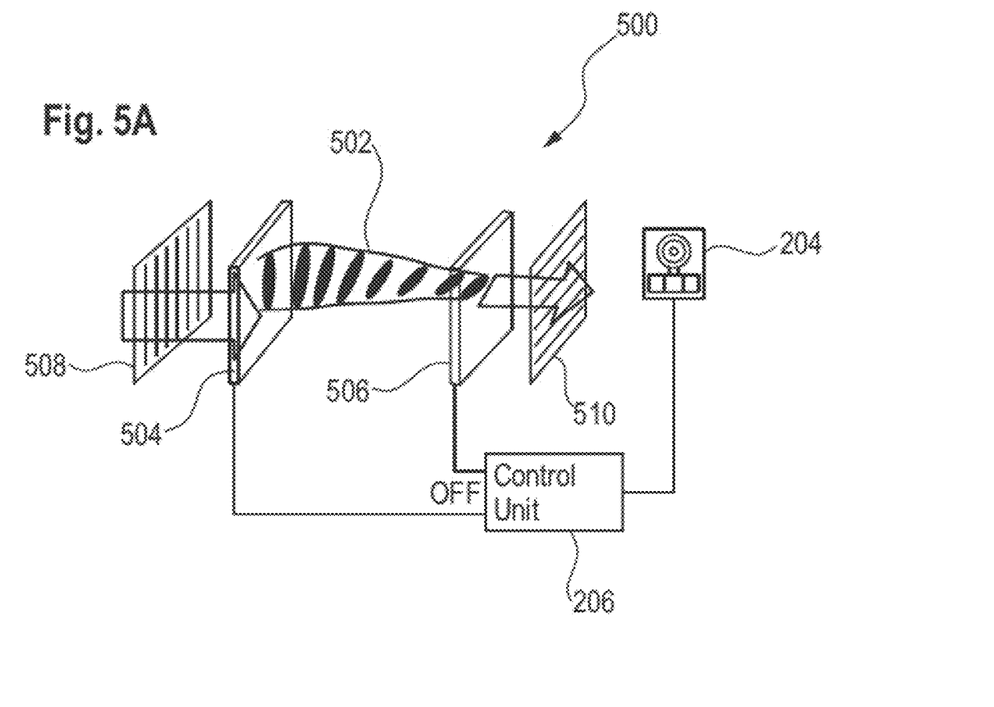
FIG. 5A and FIG. 5B are schematic diagrams of the transmissive mode and the reflective mode of a mirror element according to one or more embodiments.

FIG. 5A is a schematic view of the transmissive mode of a mirror element of an imaging system of a driver monitoring system 400 of another embodiment. The driver monitoring system 400 corresponds to the driver monitoring system 100 with the imaging system 106 shown in FIGS. 1 and 2. The mirror element shown in FIG. 5 corresponds to the mirror element 202 shown in FIG. 2 and in particular to the mirror element 300a shown in FIG. 3A. Referring to FIG. 5A, the two conductive glass panels 504 and 506 are electrically connected to the control unit 206. The conductive glass panels 504 and 506 correspond to the conductive glass panels 304a and 306a described in conjunction with FIG. 3A. The camera 204 is both electrically and communicatively connected to the control unit 206. It is noted that a viewer side is located proximate to the first polarizer 508, and a back side is located proximate to the second polarizer 510. The first polarizer 508 and the second polarizer 510 correspond to the first polarizer 308a and the second polarizer 310a described in conjunction with FIG. 3A. In the present embodiment the second polarizer 510 is a reflective polarizer. The polarization directions of the first polarizer 508 and the second polarizer 510 are aligned in a direction substantially perpendicular to each other. When no voltage is applied to the two conductive glass panels 504 and 506 (denoted as "OFF" in FIG. 5A), the molecules of the TN liquid crystal cell 402 are twisted at an angle of 90 degrees between the first polarizer 508 and the second polarizer 510. This twist causes the polarization direction of light entering the first polarizer 508 and passing through the twisted nematic liquid crystal cell 502 to rotate by 90 degrees, causing light to pass through the second polarizer 510 (transmissive mode). Hence, the camera 204 can see through the mirror element and take images of a scene/an object. The twisted nematic liquid crystal cell 502 corresponds to the twisted nematic liquid crystal cell 302a, 302b described in conjunction with FIGS. 3A and 3B.

Figure 5B:
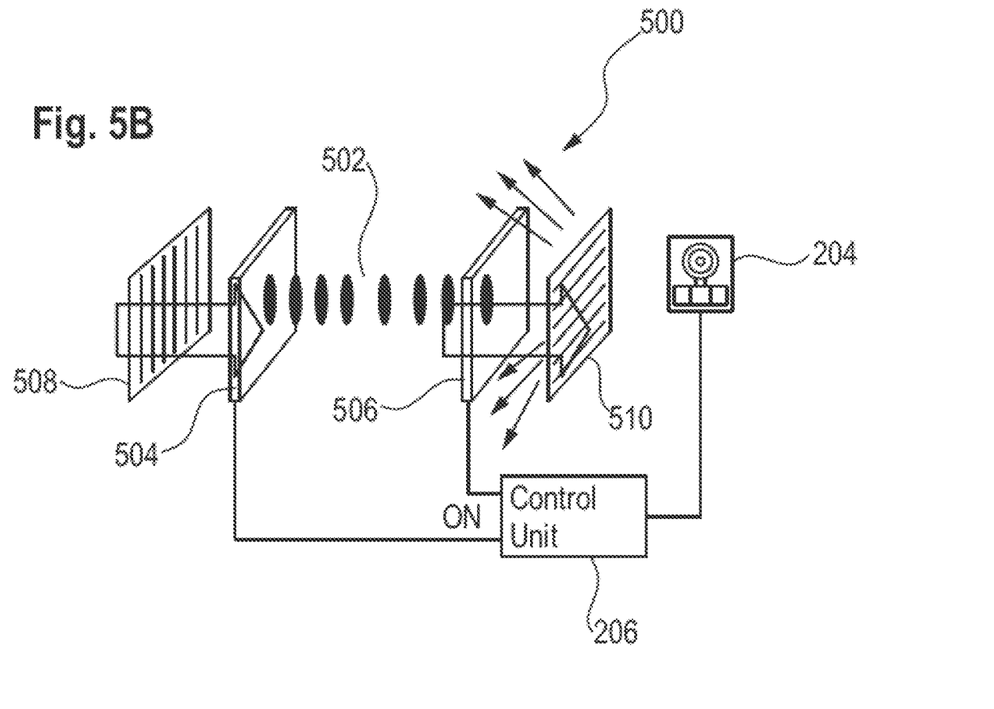

Referring to FIG. 5B, when the control unit 206 applies an electric field to the two conductive glass panels 504 and 506 (denoted as "ON" in FIG. 5B), the twist of the molecules in the nematic liquid crystal cell 502 is unwind (untwisted). As a result, the polarization of light exiting the twisted nematic liquid crystal cell 502 is perpendicular to the polarization of the second polarizer 510. Consequently, light cannot pass through the second polarizer 510 and is reflected by the second polarizer (reflective mode). Hence, the mirror element behaves like a regular mirror. The mirror element in the reflective mode helps the driver to see the scene behind them without turn their head. In other words, the application of an electric field switches the mirror element from transmissive mode to reflective mode in this embodiment.

In the embodiment depicted in FIGS. 5A and 5B, the mirror element starts in the transmissive mode (FIG. 5A, "OFF" state), in which light can pass through the mirror element and reach the imaging sensor of the camera 204. In this embodiment, due to the perpendicular polarization of the polarizers 508 and 510, the imaging sensor of the camera 204 may start to scan a row of pixels as described above directly after the driver monitoring system is initiated. After finish scanning the current row, the imaging sensor moves to a next row. During the time of moving from the current row to a next row, the control unit 206 applies an electric field to the conductive glass panels 504 and 506. Consequently, the transmissive mode of the mirror element is switched to reflective mode. Similarly, when the imaging sensor starts to scan the next row of pixels, the reflective mode of the mirror element is again switched back to the transmissive mode. The process repeats until the scanning process is completed. Afterwards, the image is assembled from the individual rows captured by the imaging sensor for further processing of the control unit 206. Throughout the scanning process, the mirror element switches repeatedly between the two modes, but the driver may not notice this due to the subtle time intervals between each transition. Within the whole time, the driver may uninterruptedly use the mirror element as a regular rearview mirror.

The embodiments depicted in FIGS. 4 and 5 may include one or more IR illuminators. The one or more IR illuminators may work in conjunction with other components of the system to capture high quality images. For example, an IR illuminator may be positioned proximate to the camera 204 to capture clear and detailed images of an object in low light conditions or even in complete darkness. The IR illuminator may in particular include IR LEDs. IR LEDs are small in size, energy efficient and have a relatively long-life span. Alternatively, the IR illuminator may include IR lamps which have a longer illumination distance. An intensity of the emitted light of the IR illuminator may be adjusted to by the control unit 208 to suit the specific lighting conditions. Additionally, the angle of the emitted light of the IR illuminator may also be adjusted to by the control unit 208.

The mirror element as depicted in FIG. 3B may also be applied in a similar way as described above.

Figure 6:
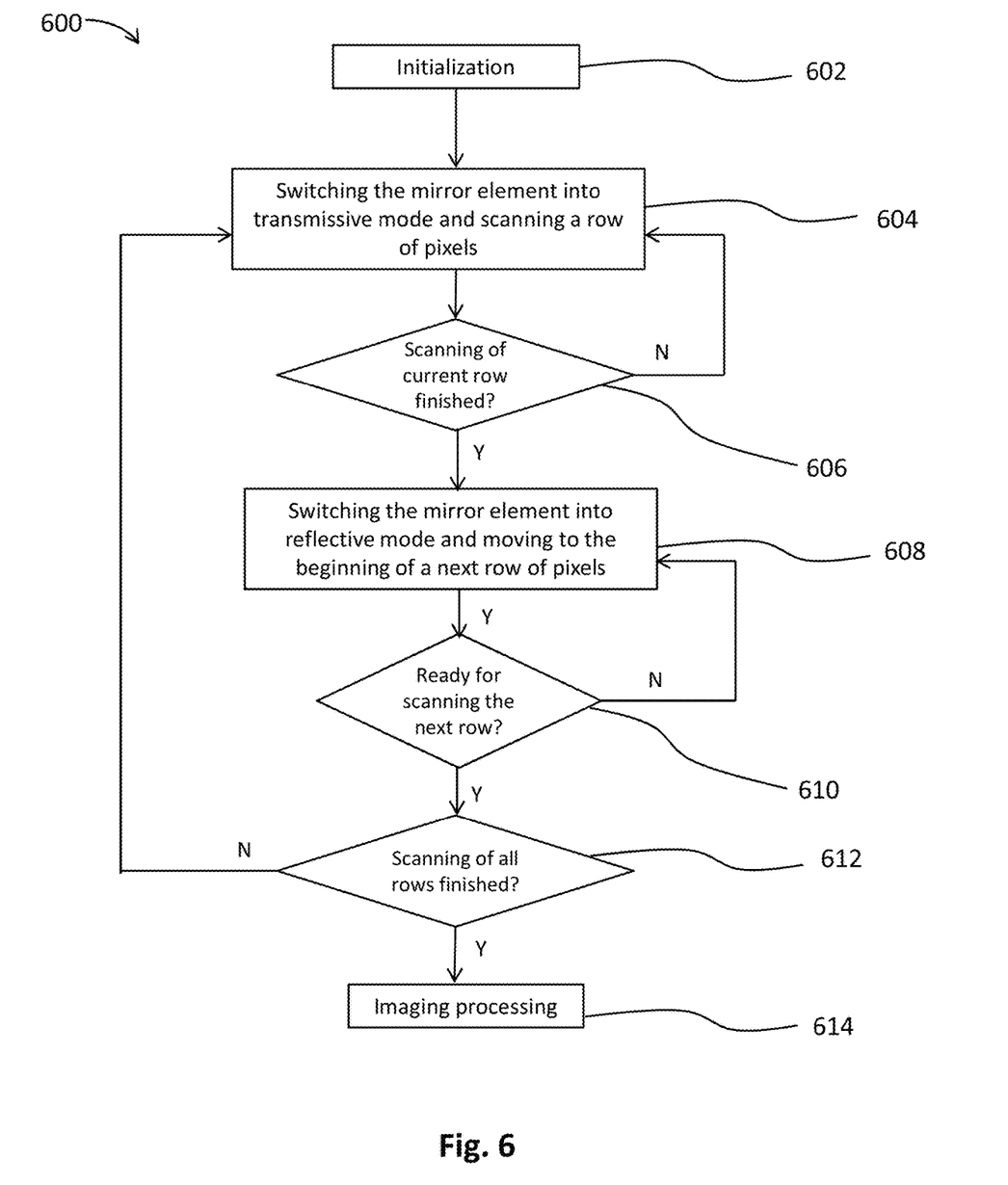
FIG. 6 is a flow diagram showing a method of imaging an object according to one or more embodiments.

FIG. 6 shows a process 600 of imaging an object according to one embodiment. At step 602, the driver monitoring system is initialized. Therein the driver monitoring system corresponds to the driver monitoring systems 100, 400 or 500 described above. The driver monitoring system may be initiated in various ways depending on the specific systems and vehicles. For example, the driver monitoring system may be automatically initiated when an engine of a vehicle is started, or when the driver's seatbelt is fastened. This may involve using sensors to detect a driver's presence or movements, such as a weight sensor in the driver-seat or a camera mounted on the dashboard. Alternatively, or additionally, the driver monitoring systems may be manually activated by the driver through a button or switch on the dashboard or steering wheel. The driver monitoring system may also be manually activated remotely through mobile devices, such as smartphones, tablets, smartwatches or the like. This can allow the driver or a vehicle owner to activate the system from a distance, such as when someone else is using the vehicle or when a teenage driver is to be monitored, or when a truck driver is to be monitored during night duty. Remote initiation of the driver monitoring system may involve using a dedicated application that is installed on a mobile device. The application may allow a user to activate the system, set alerts or notifications, and view real-time data about the driver's behaviour.

After initiation of the driver monitoring system, a control unit starts to send signals to a camera and a mirror element (e.g., the control unit, camera and mirror element corresponding to those described above in connection with FIGS. 2, 3, 4 and 5). At step 604, the control unit switches the mirror element into the transmissive mode and sends an electrical signal to the camera to power the camera on and initialize the scanning process. For example, in the embodiment depicted in FIGS. 4A and 4B, where the polarization direction of the two polarizers 404 and 406 align in the same direction, the control unit applies an electric field to the mirror element to configure/set the mirror element into the transmissive mode. In the embodiment depicted in FIGS. 5A and 5B, where the polarization directions of the two polarizers 504 and 506 align in a direction perpendicular to each other, the mirror element is already in the transmissive mode. Therefore, there is no need to apply an electric field at this point. In this step, the control unit instructs the camera to start scanning from a specific location on the imaging sensor and move in a specific pattern or direction, for example, in a left-to-right or top-to-bottom way. This process is controlled by the camera's internal software and the electrical signals sent by the control unit.

At step 606, the control unit verifies if the scanning of current row has been completed. If the scanning of the current row has been completed, the process proceeds to step 608, if the scanning is not completed, the control unit waits until is the scanning is finished.

After finishing scanning the current row of pixels, at step 608, the control unit instructs the camera to move to a next line of pixels on the imaging sensor. At the same time, the control unit switches the mirror element into reflective mode. For example, in the embodiment depicted in FIGS. 4A and 4B, the control unit removes the electric field applied to the mirror element. In the embodiment depicted in FIGS. 5A and 5B, the control unit applies an electric field to the mirror element.

At step 610, the control unit verifies if the camera is ready to scan the next row of pixels. If the camera is ready to scan the next row of pixels, the process proceeds to step 612, in which the control unit verifies if all pixels on the imaging sensor have been scanned. If not all the rows of pixels have been scanned, the process proceeds to step 604 and the subsequent steps are repeated. If all the rows of pixels have been scanned, the process proceeds to step 614.

At step 614, once all the pixels of the imaging sensor have been scanned, the control unit starts to process the image. For example, the control unit combines the scanned pixels into a complete image. The control unit may perform a series of tasks to combine the scanned pixels, including color correction, noise reduction, and image compression. The control unit may use advanced image processing algorithms that analyse the pixel data to identify specific patterns or changes in the driver's appearance or behaviour. For example, the control unit may use machine learning algorithms that have been trained on a dataset of images and videos of drowsy or fatigued drivers to recognize these visual cues in real-time.

Once the control unit has recognized these visual cues, it may trigger an alert to the driver to indicate that they are showing signs of drowsiness or fatigue. This alert may take the form of a visual or audible warning, such as a flashing light or a sound designed to prompt the driver to take a break or pull over to rest.

The control unit may, for example, continuously monitor the driver's behaviour and actions, capturing images and processing data in real-time. This may provide a high level of accuracy and responsiveness but may also require a significant amount of computational resources and power. Alternatively, or at intervals, the control unit may operate at a lower frequency, capturing images and processing data every few seconds. This may help to conserve power and computational resources. The specific frequency at which the driver monitoring system operates depends on a range of factors, including the system's intended application, the available computational resources, and the power requirements of the system.

What is claimed is:

1. An imaging system for a driver monitoring system, comprising:
   a mirror element;
   a camera comprising an imaging sensor, the camera being provided at a back side of the mirror element; and
   a control unit;
   wherein the control unit is configured to switch the mirror element from a reflective mode to a transmissive mode when the imaging sensor of the camera starts to scan a row of pixels on the imaging sensor and switch the mirror element from the transmissive mode to the reflective mode during a time in which the imaging sensor of the camera moves to a next row of pixels.

2. The imaging system according to claim 1, wherein the mirror element comprises:
   a twisted nematic liquid crystal cell;
   a first conductive glass panel and a second conductive glass panel being positioned at both sides of the twisted nematic liquid crystal cell and being adjacent to the twisted nematic liquid crystal cell; and
   a first polarizer and a second polarizer being positioned adjacent to the first conductive glass panel and the second conductive glass panel, respectively.

3. The imaging system according to claim 1, wherein the mirror element comprises:
   a twisted nematic liquid crystal cell, both sides of the twisted nematic liquid crystal cell being covered with transparent electrodes;
   a first glass panel and a second glass panel being positioned at both sides of the twisted nematic liquid crystal cell and being adjacent to the transparent electrodes; and
   a first polarizer and a second polarizer being positioned adjacent to the first glass panel and the second glass panel, respectively.

4. The imaging system according to claim 3, wherein the first polarizer and the second polarizer are aligned in a same polarization direction, or the first polarizer and the second polarizer are aligned in a direction perpendicular to each other.

5. The imaging system according to claim 4, wherein the at least one of the first polarizer and the second polarizer is a reflective polarizer.

6. The imaging system according to claim 1 further comprising:
one or more infrared illuminators proximate to the camera.

7. The imaging system according to claim 1, wherein the control unit comprises a driving circuit for applying a voltage to a twisted nematic liquid crystal cell to control an orientation of liquid crystal molecules in the twisted nematic crystal cell.

8. A rearview mirror comprising the imaging system according to claim 1.

9. One of a monitoring system and a driver monitoring system comprising the imaging system according to claim 1.

10. A method for imaging an object for a driver monitoring system, the method comprising:
switching a mirror element to a transmissive mode and scanning a row of pixels on an imaging sensor of a camera; and
responsive to scanning the row of pixels, switching the mirror element to a reflective mode and moving to a beginning of a second row of pixels on the imaging sensor.

11. The method according to claim 10, further comprising:
after scanning all pixels on the imaging sensor, combining the scanned pixels to obtain an image of the object.

12. The method of monitoring the object according to claim 10, further comprising monitoring a driver.

13. The method of claim 12, further comprising:
processing an image of the object to identify specific patterns or changes in an appearance or behavior for the object.

14. A non-transitory computer readable program embodied in a computer-readable storage medium that includes instructions that, when executed by one or more processors, cause the one or more processors to:
switch a mirror element to a transmissive mode and scanning a row of pixels on an imaging sensor of a camera; and
responsive to scanning the current row of pixels, switch the mirror element to a reflective mode and moving to a beginning of a second row of pixels on the imaging sensor.

15. The computer readable program of claim 14, further comprising:
after scanning all pixels on the imaging sensor, combine the scanned pixels to obtain an image of the object.

16. The computer readable medium of claim 14 further comprising monitoring a driver.

17. The computer readable medium of claim 16, further comprising:
processing the image of the object to identify specific patterns or changes in an appearance or behavior for the object.

* * * * *